United States Patent [19]
Rotz et al.

[11] Patent Number: 5,812,558
[45] Date of Patent: Sep. 22, 1998

[54] DEVICE AND METHOD FOR GENERATING MULTIPLEXED SIGNALS WITH REAL TIME INPUTS FOR TESTING VOICE GRADE CHANNELS IN A DEMULTIPLEXER

[75] Inventors: Fred B. Rotz, Indialantic; David B. Kimsey, Palm Bay, both of Fla.

[73] Assignee: Harris Corporation, Melbourne, Fla.

[21] Appl. No.: 586,320

[22] Filed: Jan. 17, 1996

[51] Int. Cl.$^6$ .................................................. G01R 31/28
[52] U.S. Cl. .......................... 371/20.1; 371/27.5; 370/535
[58] Field of Search ............................ 371/20.1, 27, 2.1, 371/27.5; 370/241, 242, 464, 535, 536, 542, 916

[56] References Cited

U.S. PATENT DOCUMENTS

| | | | |
|---|---|---|---|
| 4,059,729 | 11/1977 | Eddy et al. | 370/249 |
| 4,347,600 | 8/1982 | Abbott et al. | 370/225 |
| 4,639,882 | 1/1987 | Keats | 364/550 |
| 5,197,062 | 3/1993 | Picklesimer | 370/508 |

*Primary Examiner*—Trinh L. Tu
*Attorney, Agent, or Firm*—Rogers & Killeen

[57] ABSTRACT

A device and method for generating a test signal for testing communication system demultiplexing equipment in which voice grade channels are designated to receive a real time input when a test signal is provided to the demultiplexing equipment. A bit stream representing a multiplex of test pattern data is generated and modified by inserting identifiers into the bit stream to indicate portions of the bit stream where real time information is to be inserted. The indicated portions of the modified bit stream are overwritten with the real time input.

19 Claims, 4 Drawing Sheets

DEVICE AND METHOD FOR GENERATING MULTIPLEXED SIGNALS WITH REAL TIME INPUTS FOR TESTING VOICE GRADE CHANNELS IN A DEMULTIPLEXER

BACKGROUND OF THE INVENTION

The present invention relates to communication system testing, and more particularly to a device and method for testing a demultiplexer in which a real time input is added to a test signal when the test signal is provided to the demultiplexer.

As is known, communication signals from several channels may be combined in a multiplexer before the combined signals are transmitted to a receiver where the signals are separated in a demultiplexer. A communication system may multiplex signals from two thousand or more channels (the channels of primary interest herein are voice grade channels, although the invention is not so limited.) The multiplexer may add bits for framing, stuffing (that is, adding bits to compensate for channels which are providing signals are different rates, the nominal rate is normally a multiple of 64 kbps), and other administrative functions that are recognized and removed by the demultiplexer.

By way of example, and with reference to FIG. 1, a device 10 for providing a multiplexed signal may include a multiplexer 12 with several multiplexing levels (only two levels are shown in FIG. 1, although the invention herein is not so limited). Signals from channels a1, a2, . . . , xn may be combined at a first level in the manner indicated and the signals 1, . . . , s from the first level may be combined at a second level. The output A from the multiplexer 12 may be a serial bit stream that may be provided to a scrambler 14 for randomizing the data to avoid undesirable strings of bits of one type. Randomization may be accomplished by providing an Exclusive OR between the bit stream A and a fixed pattern of bits that may be repeated in manner related to the framing of the bits. The output C of scrambler 14 may be provided to an encoder 16 for modifying the signal as needed for the type of modulation to be used in transmitting the signal. The output D of encoder 16 may be converted from a digital signal to an analog output signal E in modulator 18, and thereafter transmitted. The receiver operates in analogous manner, except in reverse. It may have a demodulator and a decoder to convert the received signal to a digital stream that is desirably the same as signal C. The demultiplexer uses the framing information provided by the multiplexer to sort out the signals and provide signals to the channels a1, a2, . . . , xn. Various multiplexers are available that may include additional features to provide a manufacturer with some competitive advantage. Such features may be added with another channel, frequently denoted a "service channel" or "orderwire", added to signal A, for example. Such additions may create unique formats.

Equipment for testing demultiplexing equipment desirably tests voice fidelity and bit error ratio. In order to conduct a meaningful test of the demultiplexer, all or most of the channels should be used in a manner that duplicates or at least approximates the operating environment. To this end, a test signal may be generated that simulates a multiplexed signal with inputs from all of the channels. The test signal should be in a form that allows reasonable interpretation of system performance.

As mentioned above, various operating formats for combining signals from the channels, framing the separate signals, stuffing the extra bits, and administering the communication system are in use. Thus, it is highly desirable that the test signal generator be flexible enough to place the test signal in the proper format.

Conventional equipment for testing the operation of the equipment in the communication system typically does not operate the demultiplexer in a manner that simulates the operating environment and thus may not detect degraded system performance. For example, typical test signals contain predetermined data patterns that provide only limited testing. There is no provision for adding a real time input such as data from a modem, a microphone output, or noise to realistically test the extraction and interpretation of data in the receiving equipment, or to test routing functions that interpret in-channel routing information. There is not provision for varying the timing of the inputs to test recognition of bits that were stuffed. Further, such equipment is typically compatible with only one operating format.

One approach has been to use a multiplexer to generate a test signal. This is generally costly, and requires a large number of sources of test data in order to generate a test signal that is fully populated (fills all of the channels.) Another approach has been to use a multiplexer with a single source. However, this does not generate realistic channel loading. Some less elaborate test equipment generates test signals corresponding to signal A in FIG. 1, but only with framing bits and random data. This approach does not provide the opportunity to test bit error ratio and fidelity of individual voice grade channels.

SUMMARY OF INVENTION

Accordingly, it is an object of the present invention to provide a novel device and method for testing a demultiplexer that obviates the problems of the prior art.

It is another object of the present invention to provide a novel device and method for testing a demultiplexer with a device that generates a test signal that includes test data on all channels, and in which several of the channels include real time inputs in order to more closely approximate the operating environment.

It is yet another object of the present invention to provide a novel device and method for testing a demultiplexer with a device that generates a test signal that includes a serial bit stream with data from several of the channels overwritten with real time inputs.

It is still another object of the present invention to provide a novel device and method for generating a test signal that includes a test pattern with both conventional predetermined test data and real time data from a modem, microphone, or noise.

It is a further object of the present invention to provide a novel device and method for testing a demultiplexer with a device that generates a test signal by indicating portions of the test signal that represent channels which are to receive real time data and overwriting the indicating portions with the real time data when the test signal is provided to the demultiplexer.

It is yet a further object of the present invention to provide a novel device and method for generating a test signal that contains a multiplicity of multi-bit words, and in which a bit in the words associated with channels that are to receive real time data indicates whether the remainder of the word is to be overwritten with the real time data when the test signal is provided to the demultiplexer.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

The present invention provides added realism to the test signal by being flexible enough to include meaningful data on every channel (to test bit error rate and fidelity at full loading), to include real time inputs in some of the channels that are being simulated by the test signal (to vary test conditions dynamically), and is easily made compatible with various operating formats.

In a preferred embodiment of a method of testing a demultiplexer for a communication system with a multiplicity of channels, a predetermined test pattern may be generated from test information associated with the channels, the predetermined test pattern may be modified by including identification codes to identify portions related to channels that are to receive a real time input, and the portions of the modified test pattern associated with the channels that are to receive the real time input may be overwritten with the real time input when the test signal is provided to the demultiplexer.

Figure 1:
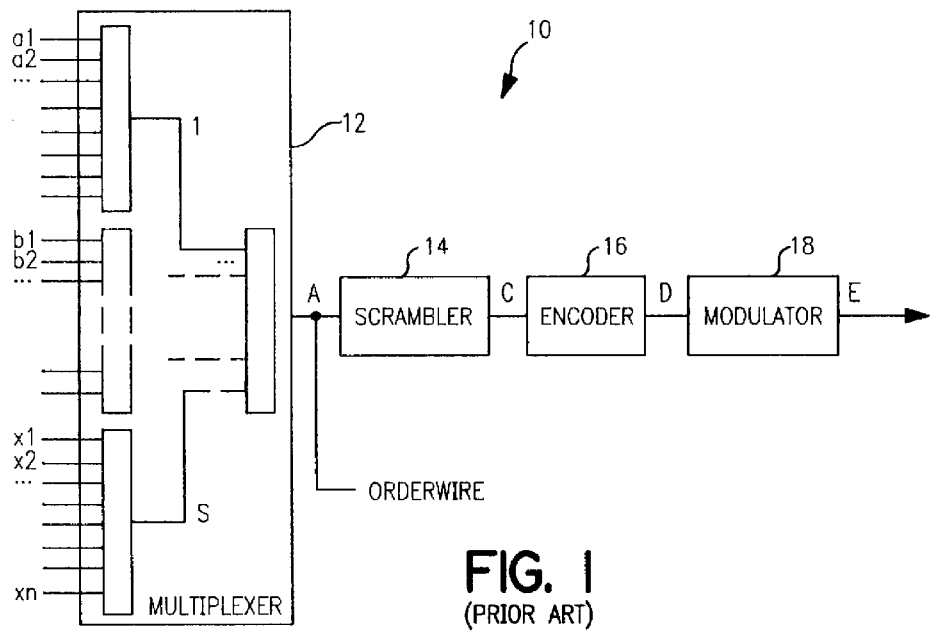
FIG. 1 is a block diagram of a conventional device for multiplexing plural channels.

Generation of the test pattern. The test pattern may be generated conventionally with the following steps:

calculating a binary data stream that corresponds to the signal D in FIG. 1, except the channels are fully populated with test information (e.g., patterns of data, random data, tones, etc.), storing the data stream in a suitable memory (e.g., RAM), and repeatedly providing the data stream from the memory to the demultiplexer, either directly or through a modulator.

The data stream may be calculated with a conventional computer by simulating bit streams from all channels and calculating the resulting bit streams at each A, C, D, and E from FIG. 1. Calculation of D can be omitted if an encoder is used, and calculation of E can be omitted if the test signal is to remain in digital form or if a modulator is used. All of the overhead bits can be added for each level of coding. Stuffing can be evaluated by varying the simulated input rate from some of the channels. A typical test pattern may be a serial bit stream of one to two million symbols in eight bit bytes.

Figure 2:
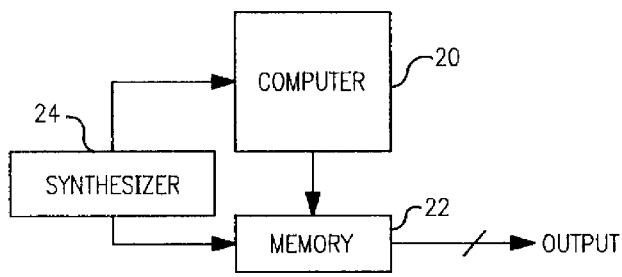
FIG. 2 is a block diagram of a prior art test pattern generation device.

With reference to FIG. 2, a computer 20 such as a PC-AT with an IEEE-488 protocol may be used to generate the test pattern. To this end, it may include a channel mux program for generating the first multiplex level of interleaved voice grade channels and introducing the appropriate overhead, a tributary mux program for interleaving at further multiplex levels, adding appropriate overhead, and adding format-unique orderwire information, a randomize program for generating signal C (FIG. 1), and encoder and modulation simulation as needed. The output may be provided to a memory 22 for repeatedly providing the test pattern, such as a LeCroy 9100 recirculating fast RAM. A synthesizer 24 (e.g., 0.5–40 MHz) may provide timing signals and/or simulated signals for the memory 20 and computer 20.

Real time signal integration. In a preferred embodiment, the test pattern is modified by adding the ability to inject real time signals into the test pattern. Prior to calculation of the test pattern, a set of channels may be selected to receive a real time input. During calculation of the test pattern the portions of the pattern associated with the selected channels may be tagged or otherwise identified. When the test pattern is provided to the demultiplexer that is to be tested, real time inputs may be inserted into the test pattern at the identified portions, overwriting the existing test pattern. The real time inputs may include signals that would be carried by the communication system such as from a fax, modem, microphone, PC or simply noise.

Figure 3:
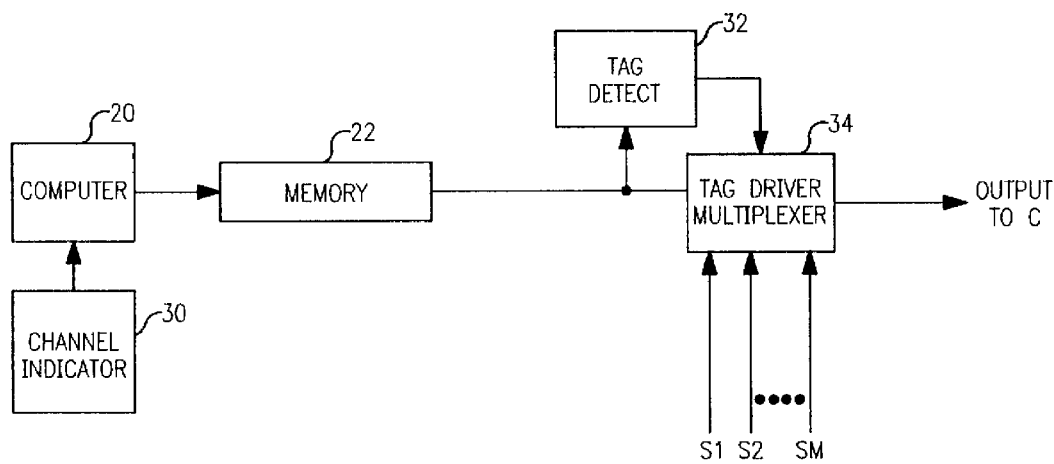
FIG. 3 is a block diagram of an embodiment of the present invention.

With reference now to FIG. 3, computer 20 may include an indicator 30 for allowing designation of the channels that are to receive the real time inputs, and for inserting tags, markers, identification codes or the like into the test pattern to indicate the portions of the pattern that are for the designated channels. This capability may be provided in a modification of the test pattern generation software. The modified test pattern may be provided to a device 32 for detecting the tags and to a tag-driven multiplexer 34 that provides the real time inputs S1, S2, . . . , SM by overwriting the indicated portion of the test pattern. The real time inputs would then appear in the test pattern and be seen in the appropriate channels after the test pattern has been demultiplexed. Any number of channels may receive the real time inputs, and it has been found that a reasonable test of a demultiplexer for a 672 channel signal may be conducted with eight channels receiving the real time inputs, and all of the other channels receiving test data inputs.

A brief discussion of the problems associated with bit substitution will facilitate an understanding of test pattern generation. The bits from a real time channel correspond to specific locations in the multiplexed data stream. That is, there are bit locations in the data stream which correspond to specific voice grade channels. The multiplexed stream for the test pattern was initially generated with some value assumed for each bit location, including the bit locations that are to be overwritten with bits from real time sources. If the value of the bit from the real time source that is to be inserted into the data stream is the same as the original assumed values, then the data stream is correct and no change is required. On the other hand, if the bit from the real time source is not the same as the assumed bit value, then a new bit value must be substituted. However, merely substituting the new bit value may introduce an error in some other channel, depending on the encoding scheme used.

Figure 4:
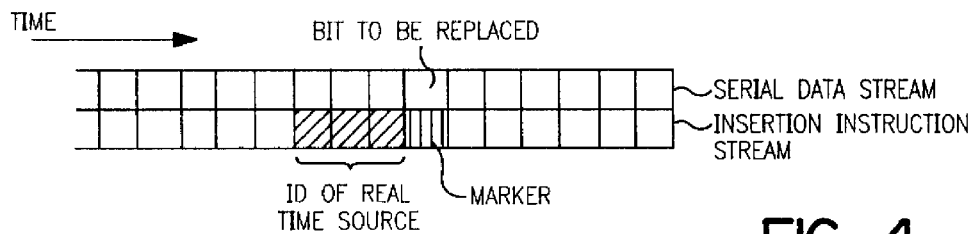
FIG. 4 is a chart illustrating simple bit substitution.

Consider a single stream carrying multiplexed serial data which simulates data in a plurality of channels and which has not been scrambled or decoded, such as illustrated in FIG. 4. A parallel data stream carries insertion instructions with markers indicating where bits from an identified real time source (e.g., a three bit identifier allows up to eight real time sources) are to be inserted. As each marker is encountered, the next bit is retrieved from the identified real time source and inserted into the marked location. When the multiplexed signal is demultiplexed, the signal from the real time source is reformed. In this example, simply inserting the bits would have no effect on other channels.

Figure 5:
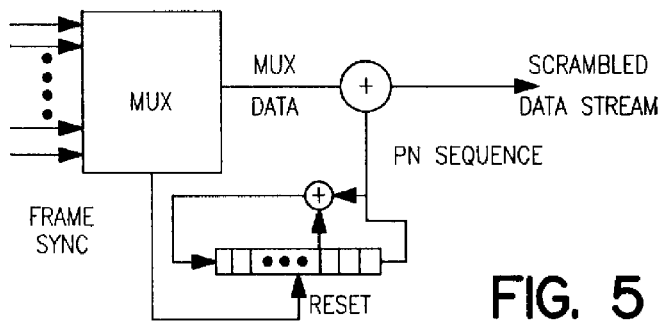
FIG. 5 is a block diagram of a synchronous additive scrambler system.

If a synchronous, adaptive scrambler is added to the final data stream the substitution becomes more complex. An exemplary system with a synchronous, adaptive scrambler is illustrated in FIG. 5. The scrambler is set to an initial condition at each frame of the multiplexed data stream. The scrambler generates a pseudo-noise (PN) sequence which is added (Exclusive OR) to the multiplexed data on a bit-by-bit basis. As a result, each bit value depends on the underlying data and whether the output from the PN generator is one or zero. The PN generator output for each bit location in a frame is fixed so that the PN generator output effect on each data bit is known.

Figure 6:
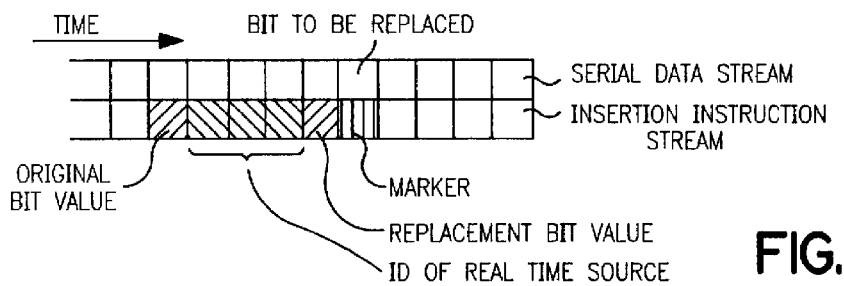
FIG. 6 is a chart illustrating bit substitution in the system of FIG. 5.

With reference now to FIG. 6, the information in the insertion instruction stream used to insert a real time source bit now consists of a marker to identify the location in the serial data stream where the real time bit is be inserted, the replacement bit value that is to be inserted if the original bit value does not match the real time bit, the identifier of the real time source, and the original bit value. Note that if the original bit was "1" and the PN generator output was also "1", the apparent value in the multiplexed data stream would be "0". Thus, in this instance if the real time bit is "1", then the replacement bit value should be "0", and if the real time bit is "0", then the replacement bit value should be "1".

Figure 7:
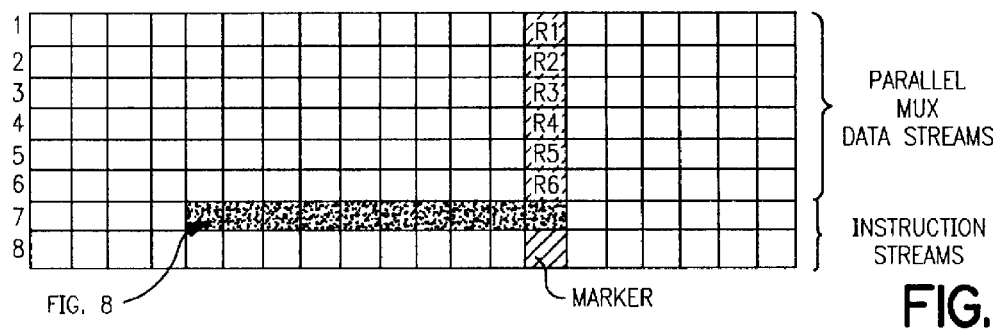
FIG. 7 is a chart illustrating symbol substitution in multiplexed parallel data streams.

These examples have assumed that one bit at a time is being replaced. However, multiplexed data may appear as symbols spanning several parallel data streams, such as illustrated in FIG. 7. For example, a 16 QAM modulation system has four parallel streams of four-bit symbols. A symbol may contain the same number or more bits than the group of data bits used to form it (e.g., by mapping n bits to m bits, where m≧n). The real time data insertion device may take the marked symbol, map it back to its underlying data and compare the value of the bit(s) of interest with the real time bit(s) to be inserted. If the values are the same, no further action is needed, but if the values not the same, the real time symbol must be substituted for marked symbol.

Figure 8:
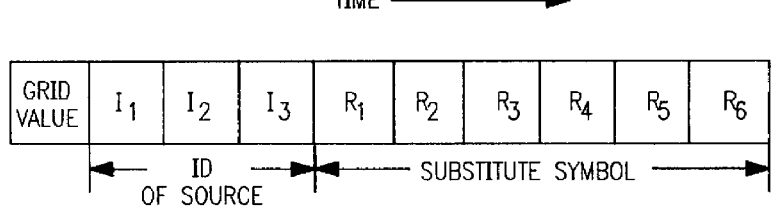
FIG. 8 depicts the substitution information in FIG. 8.

In order to substitute real time bit(s) into particular multiplex location(s) in multi-bit symbols, the symbol containing the location, the bit location in the symbol, as well as the information discussed above in relation to FIG. 6 should be included in the insertion information stream. FIG. 7 shows a data stream of eight bit bytes, where bytes occupy successive time slots. The first six bits of each byte contain a six bit symbol representing the original symbol for that time slot. The two remaining bit locations may be used to carry insertion information (the separate instruction stream for the marker in bit location 8 is optional and may be included in the bit location 7 as shown in FIGS. 4 and 6). As may be seen more clearly in FIG. 8, the system takes the serial data (R1–R6) from location 7 and assembles it into a parallel word inserts it into locations R1–R6 at the marked bit time slot.

FIG. 7 illustrates one arrangement for communicating the substitution information, and others may be used. For example, the original bit value and the source identifier may be in bit location 8, thereby reducing the serial span of the data an allowing closer (in time) spacing of real time insertions. Other formats may be optimized for particular applications. Since the initial data are all calculated in non-real time, there is considerable flexibility in formatting.

As will be appreciated, there may be limitations to software implementation of these bit substitution techniques, and some functions may be accomplished with hardware. For example, changing the value of one symbol in a differentially encoded signal may cause errors in interpreting subsequent symbols, and better results may be achieved by pre-calculating the data stream up to the encoder and implementing the encoder in hardware. Self-synchronous scramblers may be treated similarly.

Figure 9:
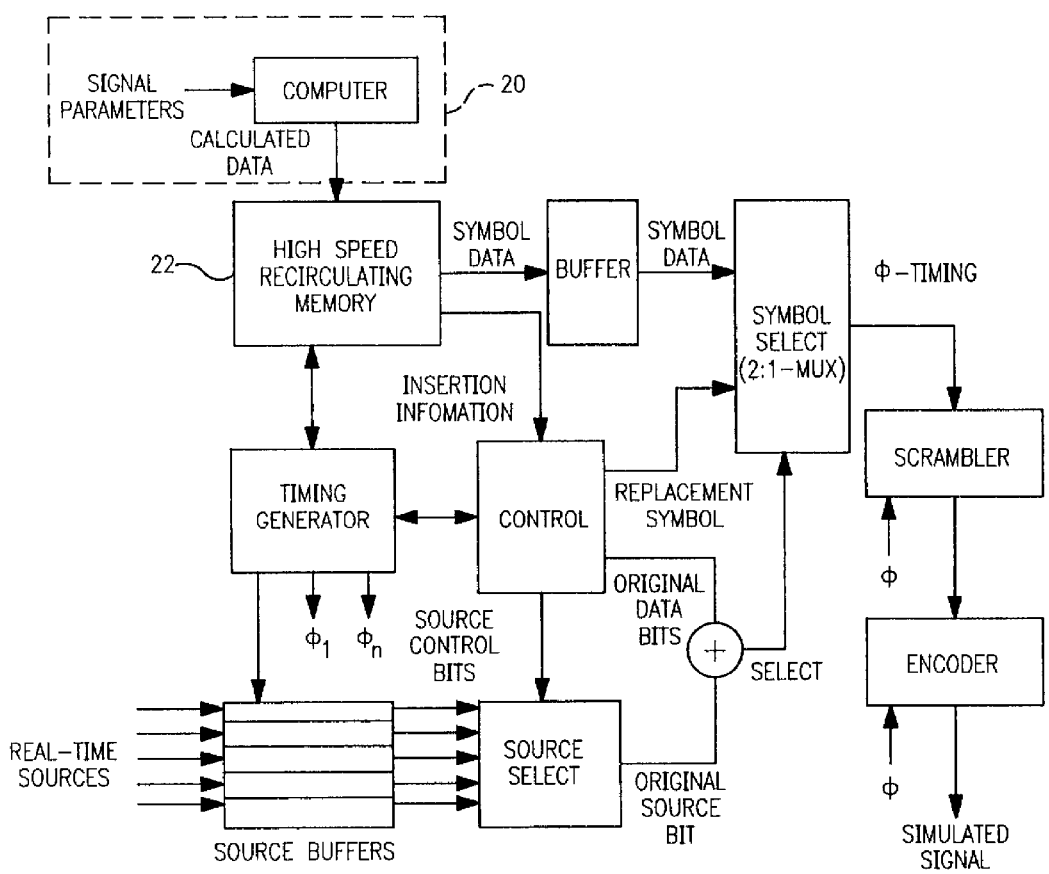
FIG. 9 is a block diagram of an embodiment of the present invention.

FIG. 9 illustrates an embodiment of the system of the present invention, including optional scrambler and encoder. The test pattern may be generated by computer 20 in the manner discussed above. Real time data from various sources may be buffered as needed and inserted into the data stream in response to the insertion information.

Figure 10A:
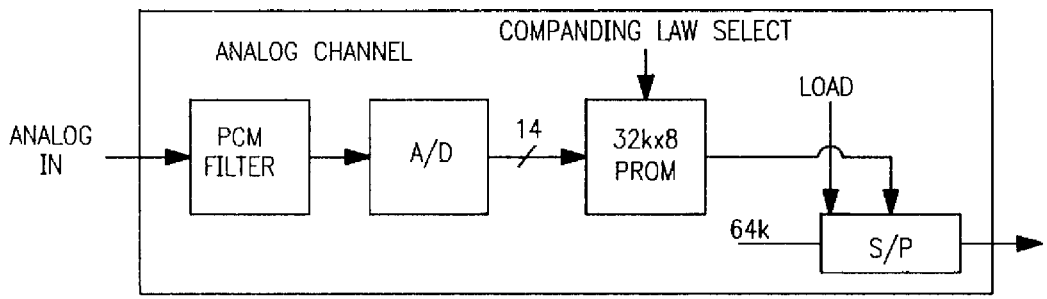
FIGS. 10a–c are schematic diagrams of embodiments of real time input devices for the embodiment of FIG. 9.
Figure 10B:
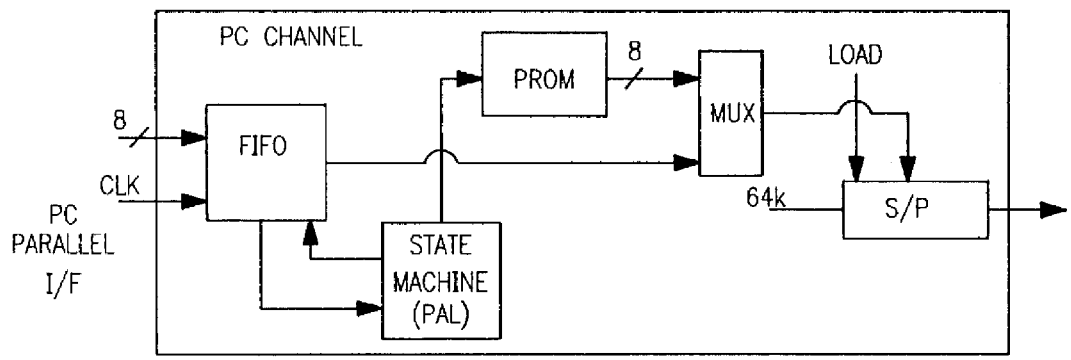
Figure 10C:
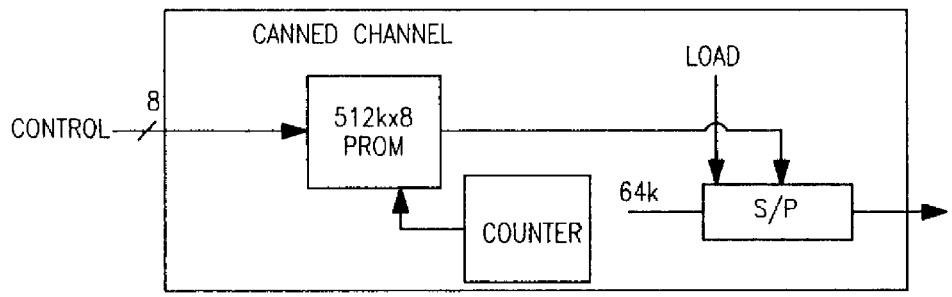

FIGS. 10*a–c* illustrate devices for generating analog, PC and canned channel real time inputs for the device of FIG. 9, and may be the source buffers in FIG. 9. Each may require parallel to serial conversion and rate buffering. The PROM may be used for non-linear conversion commonly found in telecommunications systems.

The ability to inject real time signals into a test signal offers increased testing flexibility. For example, fixed test patterns of the prior art had lengths that were determined by hardware considerations. In contrast, arbitrarily long test sequences may be used in the manner discussed herein to measure bit error rate, for example. The present invention also allows rapid and convenient changes to the type of signal present in a particular channel, which in turn facilitates the determination of the effect of different data patterns in a particular channel.

Real time injection of signaling data also permits realistic testing of the extraction and interpretation of the signaling data in the receiving equipment. Signaling data includes routing information for voice grade channels. Each voice grade channel may include its own data for in-channel signaling, or the routing information for all voice grade channels may be contained in one or more common signaling channels. Thus, the present invention allows one to direct a particular voice grade channel to various destinations in real time, a technique which permits testing of the routing functions of a multichannel communication system.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of generating a test signal for testing communication system demultiplexing equipment, the method comprising the steps of:
   (a) identifying, in a multiplexed test signal, information associated with channels that are to receive a real time input when the test signal is provided to the demultiplexing equipment;
   (b) providing insertion information bits in parallel to the multiplexed test signal, the insertion information bits including a marker for indicating a bit in the multiplexed test signal that is to be overwritten with a bit from the real time input;
   (c) overwriting the marked bit of the multiplexed test signal with a bit from the real time input; and
   (d) providing the overwritten test signal to the demultiplexing equipment for test thereof.

2. The method of claim 1 further comprising the steps of including an identifier of a real time source in the insertion information bits, and providing the real time input bit from the identified real time source.

3. The method of claim 2 further comprising the step of including a replacement bit value in the insertion information bits, wherein the replacement bit value is the value of the real time input bit modified by a pseudo-noise bit.

4. The method of claim 2 further comprising the steps of providing the marker in one insertion information bit stream parallel to the multiplexed test signal, and providing the identifier marker in a further insertion information bit stream parallel to the multiplexed test signal.

5. The method of claim 1 further comprising the step of providing the multiplexed test signal in plural parallel streams of bits, and wherein the marker indicates a bit location in the parallel streams that is be overwritten with bits from the real time input.

6. The method of claim 5 further comprising the step of including an identifier of a real time source in the insertion information bits, and providing the real time input bits from the identified real time source.

7. The method of claim 6 further comprising the step of including replacement bit values in the insertion information.

8. The method of claim 7 further comprising the step of modifying the real time input bits with pseudo-noise bits, wherein the replacement bit values are the modified real time input bits.

9. The method of claim 1 further comprising the steps of comparing the marked bit value to the value of the bit from the real time input, and overwriting the marked bit if the two values are not the same.

10. A method of testing a demultiplexer for a communication system with a multiplicity of channels, the method comprising the steps of:

(a) generating a multiplexed test pattern from test information associated with the channels;

(b) storing a modification of the test pattern in which an identification code has been inserted into the generated test pattern to identify one of the channels that is to receive a real time input; and (c) selectively overwriting portions of the modified test pattern for the identified channel, the overwritten portions including the real time input.

11. The method of claim 10 further comprising the step of providing the predetermined test pattern and the identification code in parallel bit streams.

12. The method of claim 11 further comprising the step of including in the identification code a marker to indicate a specific bit to be overwritten with a bit from the real time input, and a source identifier to indicate a source of the real time input.

13. The method of claim 12 further comprising the step of including in the identification code a bit value that is to replace the value of the specific bit that is to be overwritten.

14. The method of claim 13 further comprising the step of comparing the replacement bit that to the value of the specific bit that is to be overwritten.

15. The method of claim 10 wherein the modification identifies multiple channels that are to receive a real time input.

16. A device for generating a test signal for testing communication system demultiplexing equipment, the device comprising:

a computer for providing a multiplexed test pattern;

a source of real time data;

means for providing a marker in parallel to said multiplexed test pattern for indicating a bit in said test pattern that is to be overwritten with a bit from said source of real time data; and means for overwriting said marked bit with said bit from said source of real time data responsive to detection of said marker.

17. The device of claim 16 wherein said means for providing further is for providing an identifier for said source of real time data in parallel to said multiplexed test pattern.

18. The device of claim 17 wherein said means for providing further is for providing a replacement bit value in parallel to said multiplexed test pattern.

19. The device of claim 18 further comprising a synchronous additive scrambler for generating a pseudo-noise bit, and means for changing said replacement bit value responsive to said pseudo-noise bit.

* * * * *